(12) United States Patent
Tsunashima (10) Patent No.: US 8,411,309 B1
(45) Date of Patent: Apr. 2, 2013

(54) INTEGRATED CIRCUIT AND ELECTRONIC DEVICE

(75) Inventor: Shunji Tsunashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/603,868

(22) Filed: Sep. 5, 2012

(30) Foreign Application Priority Data

Mar. 1, 2012 (JP) .................................. 2012-045285

(51) Int. Cl.
*G06F 3/12* (2006.01)
(52) U.S. Cl. ......................... 358/1.15; 370/400; 709/238
(58) Field of Classification Search ................... 358/1.15, 358/482; 370/400; 709/232, 238
See application file for complete search history.

(56) References Cited

U.S. PATENT DOCUMENTS

| | | | | |
|---|---|---|---|---|
| 4,984,235 A | * | 1/1991 | Hillis et al. | 370/392 |
| 5,117,420 A | * | 5/1992 | Hillis et al. | 370/400 |
| 6,061,366 A | | 5/2000 | Seki et al. | |
| 2002/0073222 A1 | * | 6/2002 | Sonoda et al. | 709/232 |

FOREIGN PATENT DOCUMENTS

| | | |
|---|---|---|
| JP | A-10-173659 | 6/1998 |
| JP | A-2010-200323 | 9/2010 |

* cited by examiner

*Primary Examiner* — Thomas D Lee
(74) *Attorney, Agent, or Firm* — Oliff & Berridge, PLC (57) ABSTRACT

An integrated circuit includes IP (Intellectual Property) cores and intermediary circuits. The intermediary circuits are each connected to one IP core among the IP cores, and relay, using an NoC (Network On Chip) scheme, packets transmitted/received between the IP cores. The intermediary circuits are connected to each other. Each of the intermediary circuits replaces, when the intermediary circuit has received flow-control packets which are each transmitted from one IP core to another IP core in order to notify the other IP core of free-space information of a data buffer which the one IF core has, in a case where destinations of the flow-control packets are the same IP core, the flow-control packets with one flow-control packet including the free-space information included in the flow-control packets, and transmits the one flow-control packet to the IP core which is the destination.

12 Claims, 9 Drawing Sheets

| Type=1111 | dstID=15 | Data=0000_0010_0000_0000_0000_0000_0000_0000 |

50a

| Type=1111 | dstID=15 | Data=0000_0100_0000_0000_0000_0000_0000_0000 |

50b

| Type=1111 | dstID=15 | Data=0000_0110_0000_0000_0000_0000_0000_0000 |

50ab

| Type=1111 | dstID=15 | Data=0011_0000_0000_0000_0000_0000_0000_0000 |

50c

| Type=1111 | dstID=15 | Data=0011_0110_0000_0000_0000_0000_0000_0000 |

50abc

INTEGRATED CIRCUIT AND ELECTRONIC DEVICE

CROSS-REFERENCE TO RELATED APPLICATIONS

This application is based on and claims priority under 35 USC 119 from Japanese Patent Application No. 2012-045285 filed Mar. 1, 2012.

BACKGROUND (i) Technical Field

The present invention relates to an integrated circuit and an electronic device.

(ii) Related Art

Regarding communication control, technologies for reducing the size of packets on a network are known.

SUMMARY

According to an aspect of the invention, there is provided an integrated circuit including multiple IP (Intellectual Property) cores and multiple intermediary circuits. The multiple intermediary circuits are each connected to one IP core among the multiple IP cores, and relay, using an NoC (Network On Chip) scheme, packets which are transmitted/received between the IP cores. The multiple intermediary circuits are connected to each other. Each of the multiple intermediary circuits replaces, when the intermediary circuit has received multiple flow-control packets which are each transmitted from one IP core to another IP core in order to notify the other IP core of free-space information of a data buffer which the one IP core has, in a case where destinations of the multiple flow-control packets are the same IP core, the multiple flow-control packets with one flow-control packet including the free-space information included in the individual flow-control packets, and transmits the one flow-control packet to the IP core which is the destination.

BRIEF DESCRIPTION OF THE DRAWINGS

Exemplary embodiments of the present invention will be described in detail based on the following figures, wherein.

DETAILED DESCRIPTION

Exemplary Embodiment

Configuration

An LSI (large scale integration) circuit that utilizes an SoC (system-on-chip) technology includes various circuit modules in order to realize a system or a sub-system. Among the circuit modules, functional blocks that configure LSI circuits such as a CPU (central processing unit), an image processing circuit, and a memory are called IP cores. Examples of the IP cores include a wide range of IP cores from IP cores whose functional level is high, such as an IP core that functions as a CPU, an IP core that is used for media processing, and an IP core that is used for communication processing, to general-purpose IP cores, such as an IP core that functions as a timer, an IP core that functions as an interruption controller, and an IP core that functions as a memory. Furthermore, an NoC technology for connecting IP cores to each other by applying a typical network technology to the SoC technology exists. A method that utilizes credit-based flow control in order to efficiently use a bandwidth in a network in the case of transmission/reception of data between IP cores that are connected by utilizing the NoC technology is known. In the case of describing an integrated circuit according to a present exemplary embodiment, first, credit-based flow control that is an underlying technology will be described.

Figure 1:
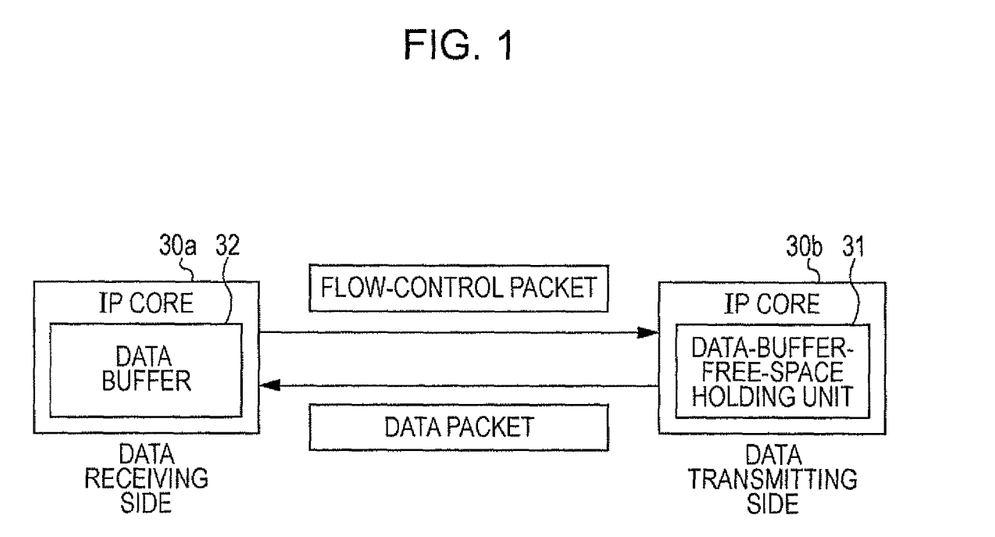
FIG. 1 is a schematic diagram for explaining credit-based flow control.

FIG. 1 is a schematic diagram for explaining credit-based flow control. In credit-based flow control, an IP core 30b that is provided on a data transmitting side includes a data-buffer-free-space holding unit 31 that stores a free space of a data buffer included in an IP core 30a which is provided on a data receiving side. When data that should be transmitted is present, the IP core 30b transmits, to the IP core 30a, data having a size that is equal to or smaller than a size indicated by the data-buffer-free-space holding unit 31. The IP core 30b updates the value of the data-buffer-free-space holding unit 31 to a value that is obtained by subtracting the size of the transmitted data from the value of the data-buffer-free-space holding unit 31. After that, when the data received by the IP core 30a is consumed and, consequently, the free space of a data buffer 32 of the IP core 30a increases, the IP core 30a describes, in a flow-control packet that is used for flow control, an amount of increase in the free space of the data buffer 32, and notifies, at a specific time, the IP core 30b which is a transmission source of the data, of the amount of increase in the free space of the data buffer 32. When the IP core 30b receives the amount of increase in the free space of the data buffer 32, the IP core 30b updates the value of the data-buffer-free-space holding unit 31 to a value that is obtained by adding the value of the amount of increase in the free space of the data buffer 32, of which the IP core 30a has notified the IP core 30b, to the value of the data-buffer-free-space holding unit 31. In this manner, in credit-based flow control, because only data having a size that is able to be received on the data receiving side is transmitted, transmission of data having a size that is not able to be received on the data receiving side in the network is not performed. Thus, the bandwidth in the network may be efficiently used.

In credit-based flow control, separately from a data transfer packet which is used for data transfer and in which the contents of data is described, the above-mentioned flow-control packet is transmitted/received between the IP cores which are connected to each other by utilizing the NoC technology. Accordingly, in order to more efficiently use the bandwidth in the network, it is desirable to reduce the number of flow-control packets as many as possible. For this reason, in the present exemplary embodiment, a mechanism that reduces the number of flow-control packets as many as possible is provided. Hereinafter, the mechanism will be described step by step.

Figure 2:
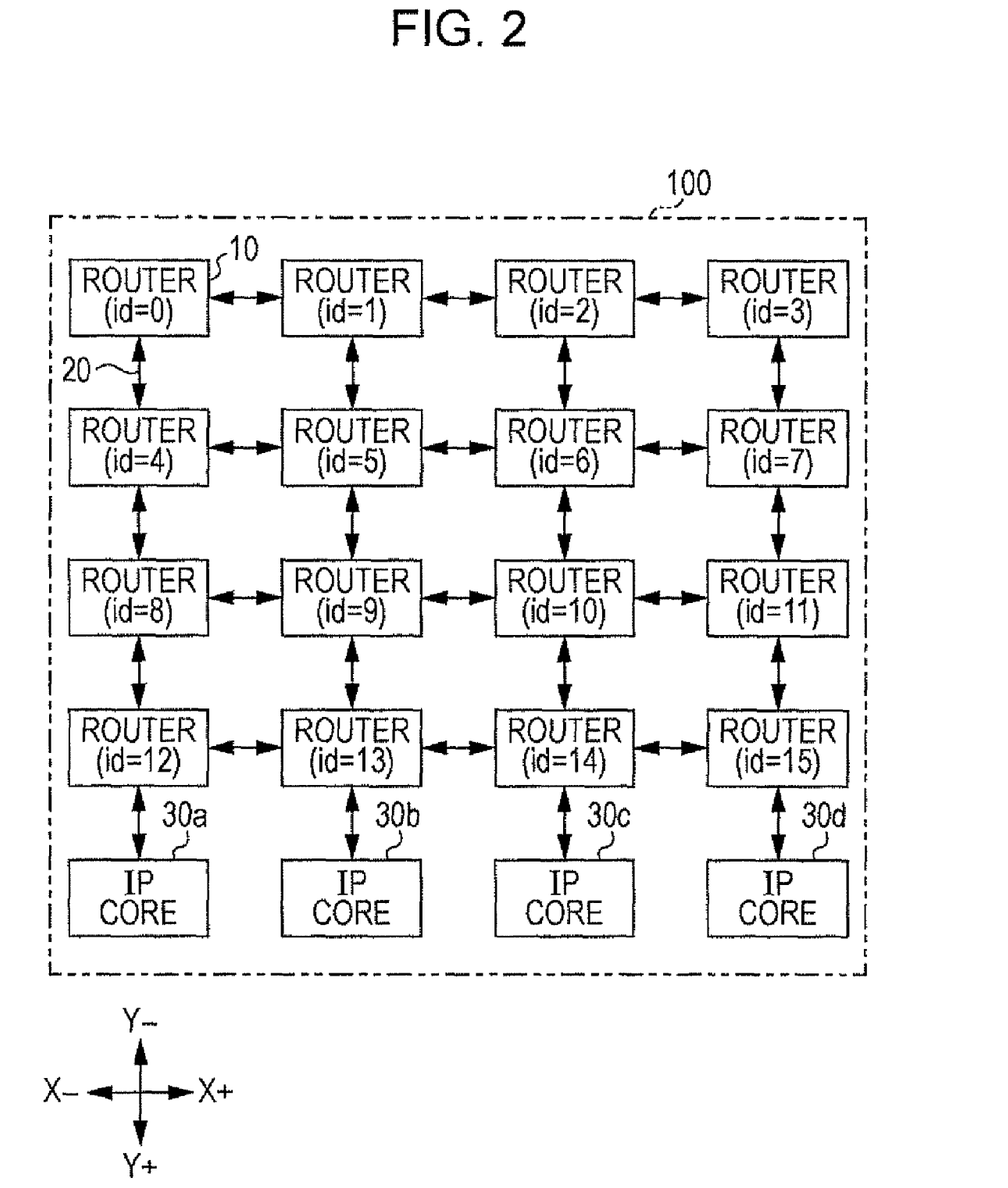
FIG. 2 is a diagram illustrating a hardware configuration of an integrated circuit.

FIG. 2 is a diagram illustrating a hardware configuration of an integrated circuit 100. The integrated circuit 100 includes multiple routers 10, IP cores 30, and conducting wires 20. The multiple routers 10 are disposed in a mesh shape. Each of the IP cores 30 is connected to a corresponding one of the routers 10. The conducting wires 20 connect the routers 10 to each other, and connect the routers 10 and the IP cores 30 to each other. Note that, although, for convenience of description, regarding the IP cores 30, only four IP cores 30, i.e., IP cores 30a to 30d, are illustrated, one IP core 30 is connected to each of the routers 10 in reality. Furthermore, when the IP cores 30a to 30d are not distinguished from one another, the IP cores 30a to 30d are simply referred to as "IP cores 30". Each of the routers 10 is an intermediary circuit that relays, using an NoC scheme, a packet which is transmitted/received between the IP cores 30. The router 10 refers to a routing table stored therein, and relays an input packet to a destination. Each of the conducting wires 20 is a metallic wire. A packet is transmitted as data through the conducting wire 20. An ID (identification) is uniquely assigned to each of the routers 10. In an example illustrated in FIG. 2, because 16 routers 10, which is represented by an equation 4×4=16, exist, each of IDs starting with an ID of "0" and ending with an ID of "15" is assigned to a corresponding one of the routers 10. Each of the IP cores 30 is an integrated circuit that realizes a specific function. In the example illustrated in FIG. 2, it is supposed that the IP core 30a is used for image processing, the IP core 30b is used for audio processing, the IP core 30c is used for communication processing, and the IP core 30d functions as a memory.

Figure 3:
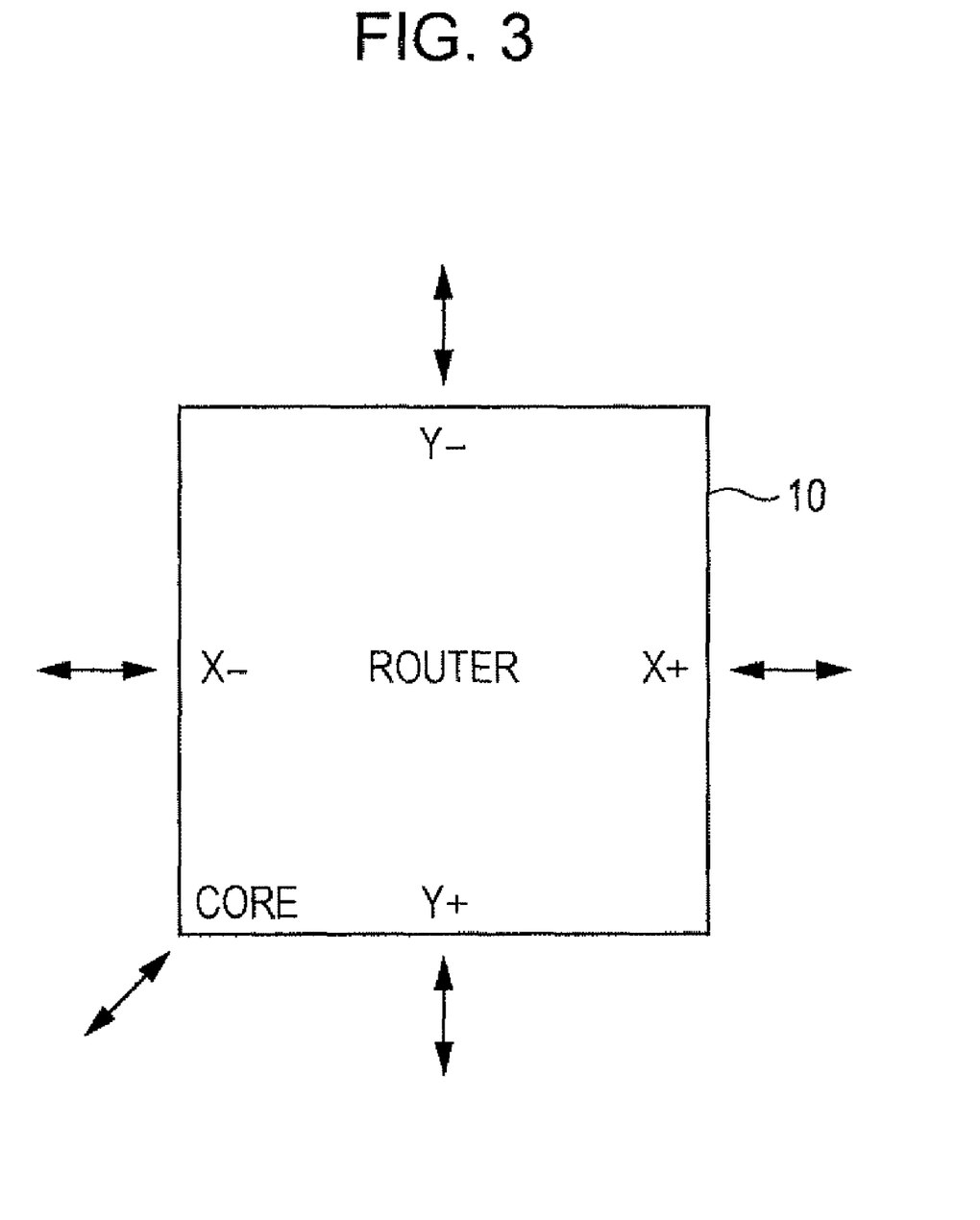
FIG. 3 is a schematic diagram for explaining the inputs/outputs of a router.

FIG. 3 is a schematic diagram for explaining the inputs/outputs of each of the routers 10. In the case where the router 10 that is disposed in the integrated circuit 100 is viewed from the vertical direction, the router 10 performs communication with other routers 10 that are positioned at the top, bottom, left, and right sides. Here, a port for the router 10 that is positioned at the right side is referred to as an X(+) port. A port for the router 10 that is positioned at the left side is referred to as an X(−) port. A port for the router 10 that is positioned at the top side is referred to as a Y(−) port. A port for the router 10 that is positioned at the bottom side is referred to as a Y(+) port. Reference numerals X(+), X(−), Y(+), and Y(+), the individual directions are also denoted by X(+), X(−), Y(+), and Y(+). Also in FIG. 2, the X(+), X(−), Y(+), and Y(+) directions are used. Moreover, each of the routers 10 has an IP-core port that is used to input/output a packet from/to the corresponding IP core 30 which is connected to the router 10.

Figure 4:
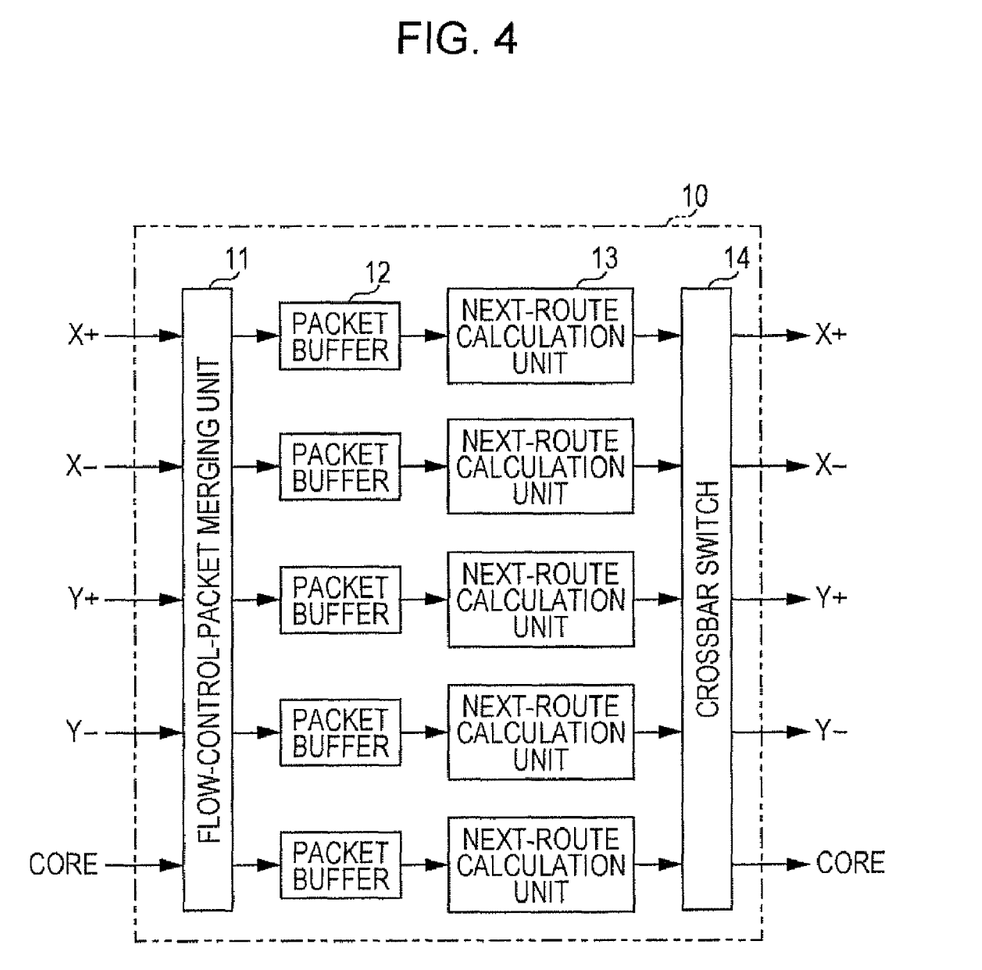
FIG. 4 is a diagram illustrating a hardware configuration of the router.

FIG. 4 is a diagram illustrating a hardware configuration of each of the routers 10. The router 10 includes a flow-control-packet merging unit 11, packet buffers 12, next-route calculation units 13, and a crossbar switch 14. The flow-control-packet merging unit 11 is an integrated circuit that merges, among packets that have been input from the individual ports, flow-control packets in accordance with a predetermined rule. The rule will be described below in detail. The flow-control-packet merging unit 11 stores input packets in the packet buffers 12. The packet buffers 12 are buffer memories that store packets. The packet buffers 12 sequentially output the stored packets to the next-route calculation units 13. Each of the next-route calculation units 13 holds a routing table regarding communication paths that are provided in the integrated circuit 100. The next-route calculation unit 13 performs calculation so that an input packet will reach, along the optimum path, a destination described in header information of the input packet. The next-route calculation unit 13 determines a router 10 or an IP core 30 that is a next transmission destination to which the packet is to be next transmitted among the routers 10 or the IP cores 30. Here, when the router 10, which is a subject of description, is described as the destination of the packet, the next-route calculation unit 13 determines that the next transmission destination of the packet is the IP core 30 which is connected to the router 10 that is a subject of description. The next-route calculation unit 13 outputs, to the crossbar switch 14, the packet whose next transmission destination has been determined. The crossbar switch 14 is an integrated circuit that dynamically selects a communication path. The communication I/F 14 outputs an input packet from a port corresponding to the next transmission destination determined by the next-route calculation unit 13. For example, in the case where it has been determined that the next transmission destination of a certain packet is the router 10 which is positioned in the X(+) direction of the router 10 that is a subject of description, the crossbar switch 14 transmits the packet from the X(+) port to the destination.

Figure 5:
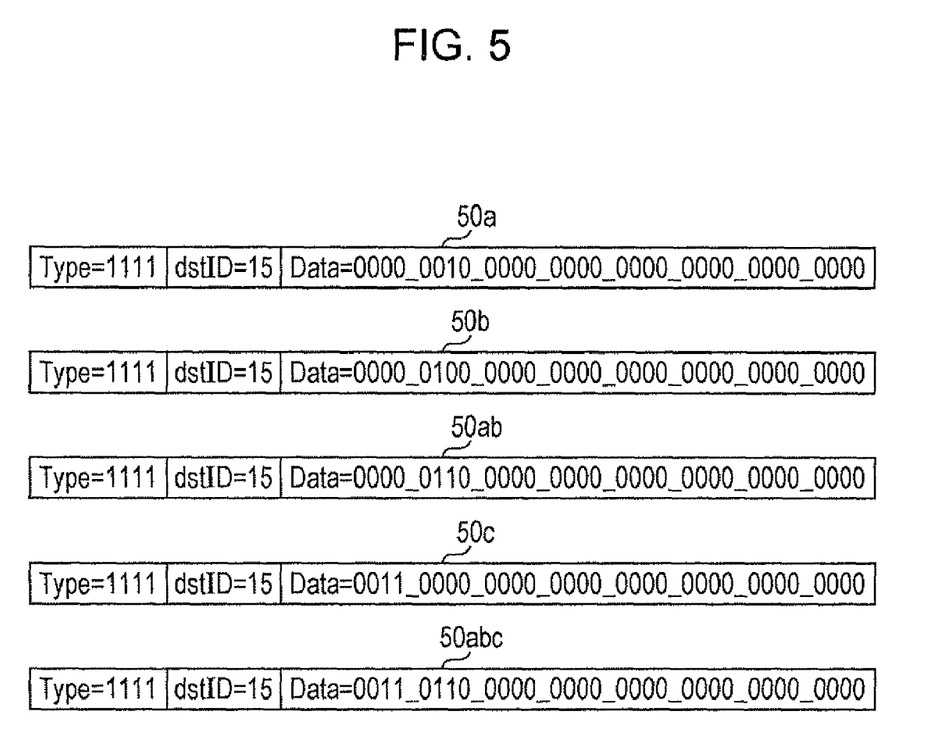
FIG. 5 is a diagram illustrating an example of a flow-control packet.

FIG. 5 is a diagram illustrating an example of a flow-control packet 50. The flow-control packet 50 includes Type that represents a packet type, dstID that represents a destination to which a packet is to be transmitted, and Data that represents an amount of increase in the free space of the data buffer included in each of the IP cores 30 as a code. Type is represented by, for example, 4 bits. Here, "1111" which indicates that the packet is a flow-control packet is described. dstID is an ID of a router 10 that is the destination to which a packet is to be transmitted. Because the number of routers 10 is sixteen in the present exemplary embodiment, dstID is represented by four bits in binary representation. In FIG. 5, for easy understanding, dstID is represented by a decimal number, for convenience. Data is represented by thirty-two bits in total, which is represented by an equation 2×16=32, and the thirty-two bits are sequentially assigned to the individual IP cores 30 in units of two bits. In the two bits that are assigned to each of the IP cores 30, an amount of increase in the free space of the data buffer 32 of the IP core 30 is described on the basis of a corresponding one of binary code systems. Each of the IP cores 30 stores a corresponding one of the code systems. In the code system, the relationships between the two bits and a code, such as "00" corresponding to "+0 bytes (in this case, no change in the free space)", "01" corresponding to "+32 bytes", "10" corresponding to "+128 bytes", and "11" corresponding to "+256 bytes", are described. Furthermore, the details of the code systems that the individual IP cores 30 store are different from one another. The IP core 30d that functions as a memory stores the above-mentioned code systems of all of the IP cores 30.

Next, a process of merging flow-control packets will be described using FIGS. 2 and 5. When flow-control packets whose packet types, which are represented by Type, indicate that the packets are flow-control packets and which have the same ID as dstID exist in the router 10 that is a subject of description, the router 10 merges the flow-control packets. For example, referring to FIG. 2, in the case where each of the IP cores 30a to 30c reads data from the IP core 30d that functions as a memory, each of the IP cores 30a to 30c transmits a flow-control packet to the router 10 (id=15) that is connected to the IP core 30d before the IP core receives the data.

A flow-control packet 50a illustrated in FIG. 5 is a packet that has been transmitted by the IP core 30a connected to the router 10 (id=12). In this case, a code representing an amount of increase of the free space of the data buffer is described in the 25-th and 26-th bits. The flow-control packet 50a is relayed to the router 10 (id=13) and the router 10 (id=14) along a path along which the flow-control packet 50a is transmitted to the router 10 (id=15). A flow-control packet 50b illustrated in FIG. 5 is a packet that has been transmitted by the IP core 30b connected to the router 10 (id=13). In this case, a code representing to an amount of increase of the free space of the data buffer is described in the 27-th and 28-th bits. Here, regarding the router 10 (id=13), when the flow-control packets 50a and 50b simultaneously exist in the router 10 (id=13), both of the packet types, which are represented by Type, of the flow-control packets 50a and 50b indicate that both of the packets are flow-control packets, and the flow-control packets 50a and 50b have the same ID as dstID. Accordingly, the router 10 (id=13) merges the flow-control packets 50a and 50b. A flow-control packet 50ab illustrated in FIG. 5 is a packet into which the flow-control packets transmitted from the IP cores 30a and 30b are merged. The flow-control packet 50ab has, as Data, 32-bit data into which the contents of the flow-control packet 50a and the contents of the flow-control packet 50b are merged. More specifically, the flow-control packet 50ab is the bitwise logical OR of the flow-control packets 50a and 50b. The flow-control packet 50ab that has been obtained as a result of merging is transmitted to the router 10 (id=15) that is a destination, and is relayed by the router 10 (id=14) along a path along which the flow-control packet 50ab is transmitted to the router 10 (id=15).

A flow-control packet 50c illustrated in FIG. 5 is a packet that has been transmitted by the flow-control packet 50c connected to the router 10 (id=14). In this case, a code representing to an amount of increase of the free space of the data buffer is described in the 29-th and 30-th bits. Here, regarding the router 10 (id=14), when the flow-control packets 50ab and 50c simultaneously exist in the router 10 (id=14), both of the packet types, which are represented by Type, of the flow-control packets 50ab and 50c indicate that both of the packets are flow-control packets, and the flow-control packets 50ab and 50c have the same ID as dstID. Accordingly, the router 10 (id=14) merges the flow-control packets 50ab and 50c. A flow-control packet 50abc illustrated in FIG. 5 is a packet into which the flow-control packets transmitted from the IP cores 30a, 30b and 30c are merged. In this manner, flow-control packets that are targets for merging are replaced with one flow-control packet including each of amounts of increase of the free spaces of the data buffers included in the individual IP cores 30 that are transmission sources of the individual flow-control packets.

Operations

Next, operations performed in the process of merging flow-control packets will be described in detail.

Figure 6:
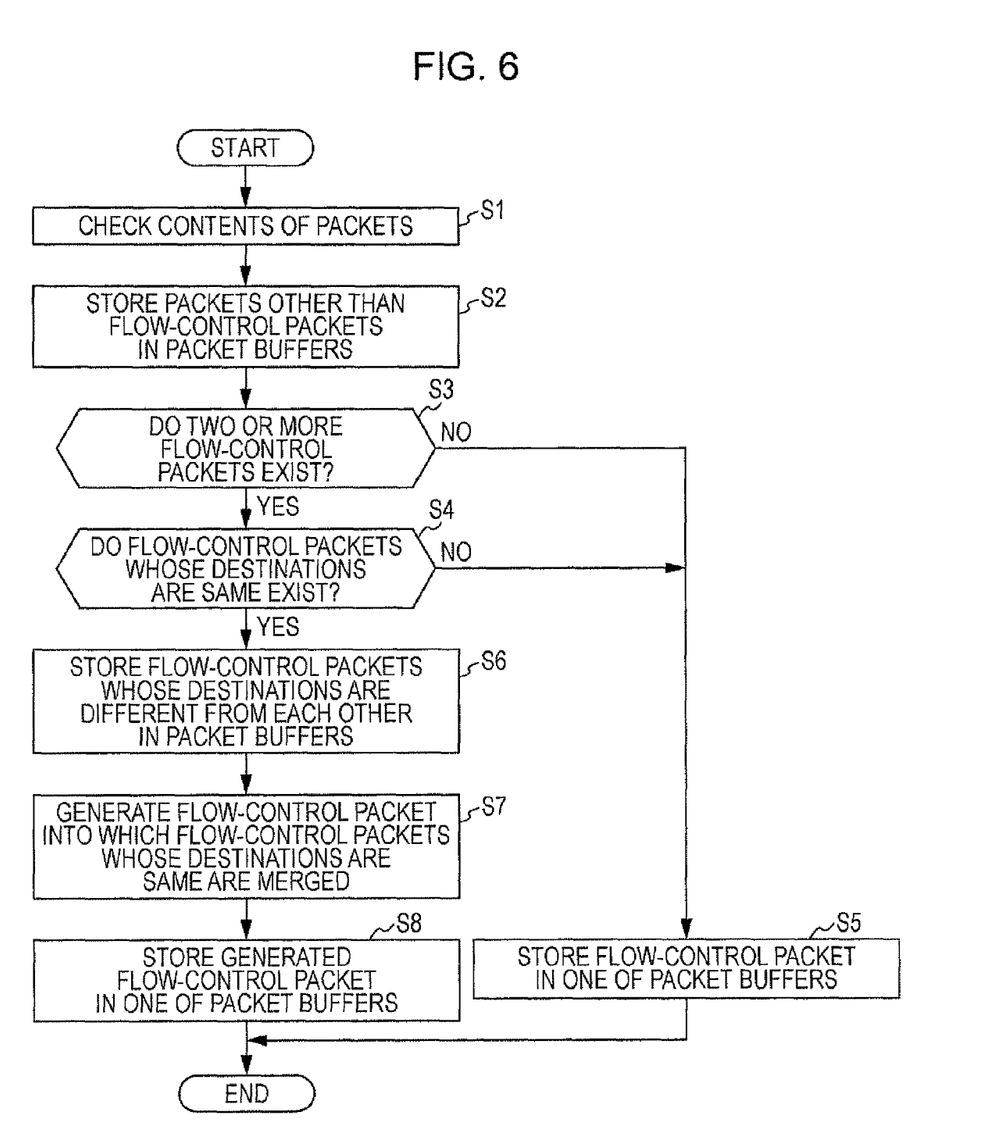
FIG. 6 is a diagram illustrating a flow of a process performed by a flow-control-packet merging unit.

FIG. 6 is a diagram illustrating a flow of a process performed by the flow-control-packet merging unit 11. First, the flow-control-packet merging unit 11 checks the contents of packets that have been input from the individual ports (step S1). Although no buffer that stores a packet is provided at a stage previous to the flow-control-packet merging unit 11, the flow-control-packet merging unit 11 is capable of reading, through each of the ports, a packet that exists in a corresponding one of the conducting wires 20. In this case, the flow-control-packet merging unit 11 checks the contents of the header information of the packets. Then, the flow-control-packet merging unit 11 stores, in the packet buffers 12, the packets whose packet types, which are included in the header information of the packets, indicate that the packets are not flow-control packets (step S2).

Next, when only one flow-control packet exists, (NO in step S3), the flow-control-packet merging unit 11 stores the flow-control packet in one of the packet buffers 12 (step S5). In contrast, when two or more flow-control packets exist, the flow-control-packet merging unit 11 determines whether or not, among the two or more flow-control packets, flow-control packets whose destinations, which are described in the header information, are the same exist (step S4). Here, when flow-control packets whose destinations are the same do not exist (NO in step S4), the flow-control-packet merging unit 11 stores the flow-control packets in the packet buffers 12 (step S5). In contrast, when at least one pair of flow-control packets whose destinations are the same exists (YES in step S4), first, the flow-control-packet merging unit 11 stores, in the packet buffers 12, flow-control packets whose destinations are not the same among the flow-control packets (step S6). At this point in time, only the flow-control packets whose packet types indicate that the packets are flow-control packets and whose destinations are the same remain in the flow-control-packet merging unit 11. The flow-control-packet merging unit 11 generates a new flow-control packet into which the flow-control packets are merged (step S7). Then, the flow-control-packet merging unit 11 stores the generated flow-control packet, which has been obtained by merging, in one of the packet buffers 12 (step S8). In this case, because the flow-control packets that have been merged into the new flow-control packet have become unnecessary, the flow-control-packet merging unit 11 discards the flow-control packets.

As described above, according to the present exemplary embodiment, regarding flow-control packets that are used in credit-based flow control, flow-control packets whose packet types indicate that the packets are flow-control packets and whose destinations are the same are merged. In typical routers that are connected without utilizing the NoC technology, in most cases, a bandwidth used in the routers is larger than a bandwidth used in communication. Accordingly, for example, regarding a packet having a reduced size because packets are combined into the packet, a process of returning the size of the packet to the original size may be performed in each of the routers. In other words, a process with margins associated with packets may be performed, relatively. Moreover, according to the present exemplary embodiment, an improvement in the efficiency of use of a network bandwidth in a small-scale circuit may be realized, compared with a case where a cash memory, a differential encoder circuit, or a decoder circuit is used. Accordingly, the present exemplary embodiment is useful for the NoC technology.

Electronic Device

Figure 7:
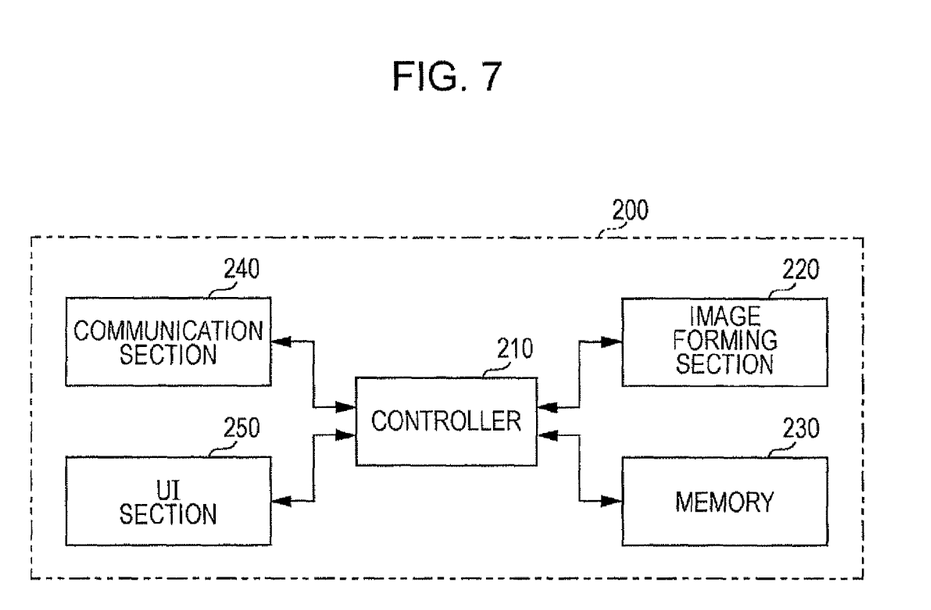
FIG. 7 is a block diagram illustrating a hardware configuration of an image forming device that uses the integrated circuit according to the exemplary embodiment.

Next, an example of an electronic device to which the integrated circuit 100 according to the above-described exemplary embodiment is applied will be described. FIG. 7 is a block diagram illustrating a hardware configuration of an image forming device 200 that uses the integrated circuit 100 according to the above-described exemplary embodiment. The image forming device 200 is configured as a computer having a controller 210, an image forming section 220, a memory 230, a communication section 240, and a UI (user interface) section 250. The individual sections are electrically connected to each other. The controller 210 includes a CPU, a ROM (read-only memory), and a RAM (random-access memory). The CPU executes a control program stored in the ROM or the memory 230, thereby controlling the individual sections connected to the controller 210.

The image forming section 220 is a section that forms an image represented by image data through individual processes of an electrophotographic system, such as a charging process, an exposure process, a development process, a transfer process, and a fixing process. The memory 230 is a storage device, such as a hard disk, and stores, for example, the control program. Under control of the image forming device 200, the communication section 240 performs communication with a client terminal, such as a personal computer, that is operated by a user, thereby obtaining image data or the like. The UI section 250 has, for example, a touch screen and keys. The UI section 250 supplies a signal to the controller 210 in accordance with the details of an operation performed by the user. The controller 210 performs determination of the details of the operation on the basis of the signal, and, for example, performs an image forming process or causes the touch screen to display an image. In the image forming device 200, the integrated circuit 100 may be used in each of the controller 210, the image forming section 220, the communication section 240, and the UI section 250.

Note that, in addition, examples of the electronic device to which the integrated circuit 100 according to the above-described exemplary embodiment is applicable include a mobile phone, a car navigation system, a television set, an air conditioner, a calculator, a personal computer, a wireless terminal, and electronic paper.

MODIFICATION EXAMPLE

The above-described exemplary embodiment may be modified as described below. Note that modification examples described below may be provided in appropriate combination.

First Modification Example

In the case of merging flow-control packets, it is necessary that two or more flow-control packets whose packet types indicate that the packets are flow-control packets and whose destinations are the same exist in a router 10, among the routers 10, that is to merge the flow-control packets. In a first modification example, in order to more easily merge the flow-control packets, a time at which the above-mentioned flow-control packets simultaneously exist in the router 10 is adjusted.

Figure 8:
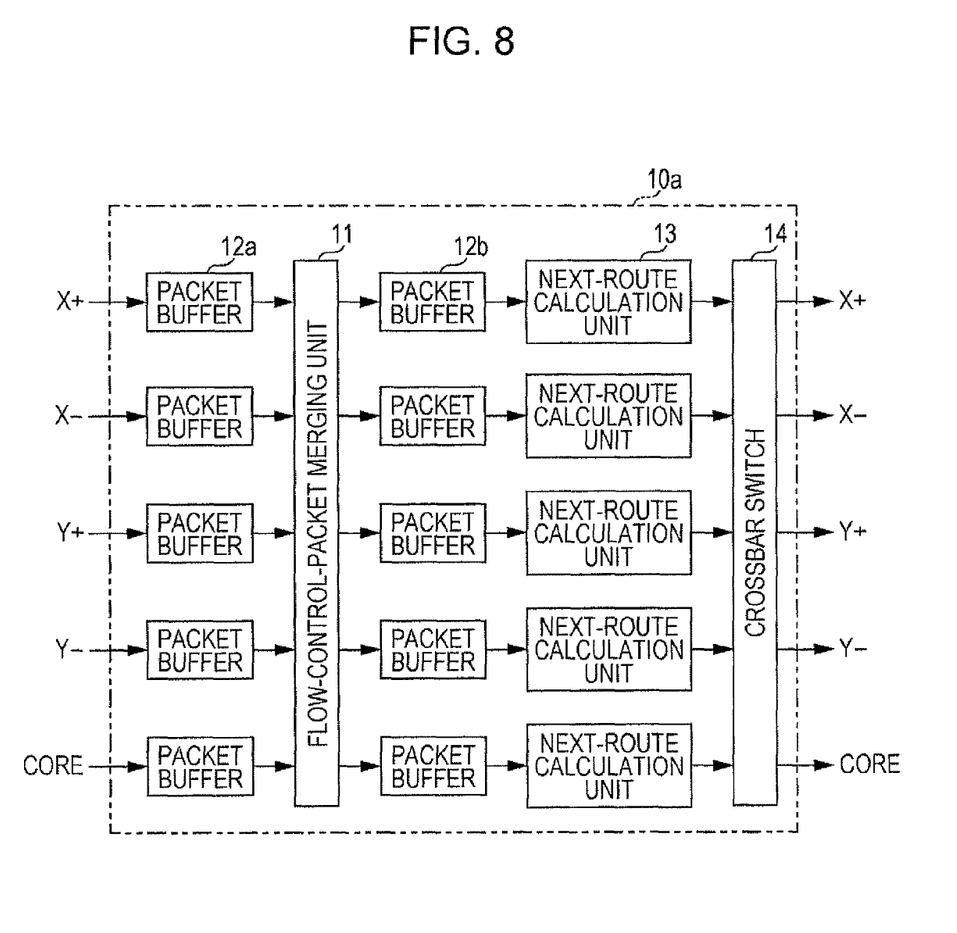
FIG. 8 is a diagram illustrating a hardware configuration of a router in a first modification example.

FIG. 8 is a diagram illustrating a hardware configuration of a router 10a in the first modification example. The router 10a includes a flow-control-packet merging unit 11, packet buffers 12a and 12b, a next-route calculation unit 13, and a crossbar switch 14. Hereinafter, elements that are the same as the elements in the above-described exemplary embodiment are denoted by the same reference numerals, and a description thereof is omitted. The difference between the router 10a in the first modification example and the router 10 in the exemplary embodiment is that, in the router 10a, the packet buffers 12a exist at a stage previous to the flow-control-packet merging unit 11. The packet buffers 12a store packets that have been input from the individual ports. In the first modification example, an integrated circuit 100 includes an IP core 30 (referred to as an "IP core 30x") that functions as a timer, and the IP core 30x is used. The IP core 30x stores an average value (a communication processing time) of a time taken to perform communication between the individual routers 10a and a time taken to perform communication between each of the routers 10a and a corresponding one of the IP cores 30. When packets are stored in the packet buffers 12a, the IP core 30x starts measuring a time. Then, when a time that is equal to the communication processing time has elapsed since the measurement started, the IP core 30x provides, for the routers 10a, a notification indicating that a timeout has occurred. When the routers 10a receive the notification, the routers 10a output the packets stored in the packet buffers 12a to the flow-control-packet merging unit 11. In other words, when packets are stored in the packet buffers 12a, the packets are stored in the packet buffers 12a for only a predetermined time period that is equal to the communication processing time. During the time period, the flow-control-packet merging unit 11 is able to read the packets stored in the packet buffers 12a. When the destinations of the multiple flow-control packets stored in the packet buffers 12a are the same IP core 30, the flow-control-packet merging unit 11 merges the multiple flow-control packets into one flow-control packet, thereby replacing the multiple flow-control packets with the one flow-control packet.

According to the first modification example, in the routers 10a, the packet buffers 12a are provided at a stage previous to the flow-control-packet merging unit 11. Packets are stored in the packet buffers 12a for the predetermined time period that is measured by the IP core 30x which functions as a timer. Additionally, the flow-control-packet merging unit 11 is able to read and process the contents of the packets stored in the packet buffers 12a.

Second Modification Example

Multiple flow-control-packet merging units 11 may be provided.

Figure 9:
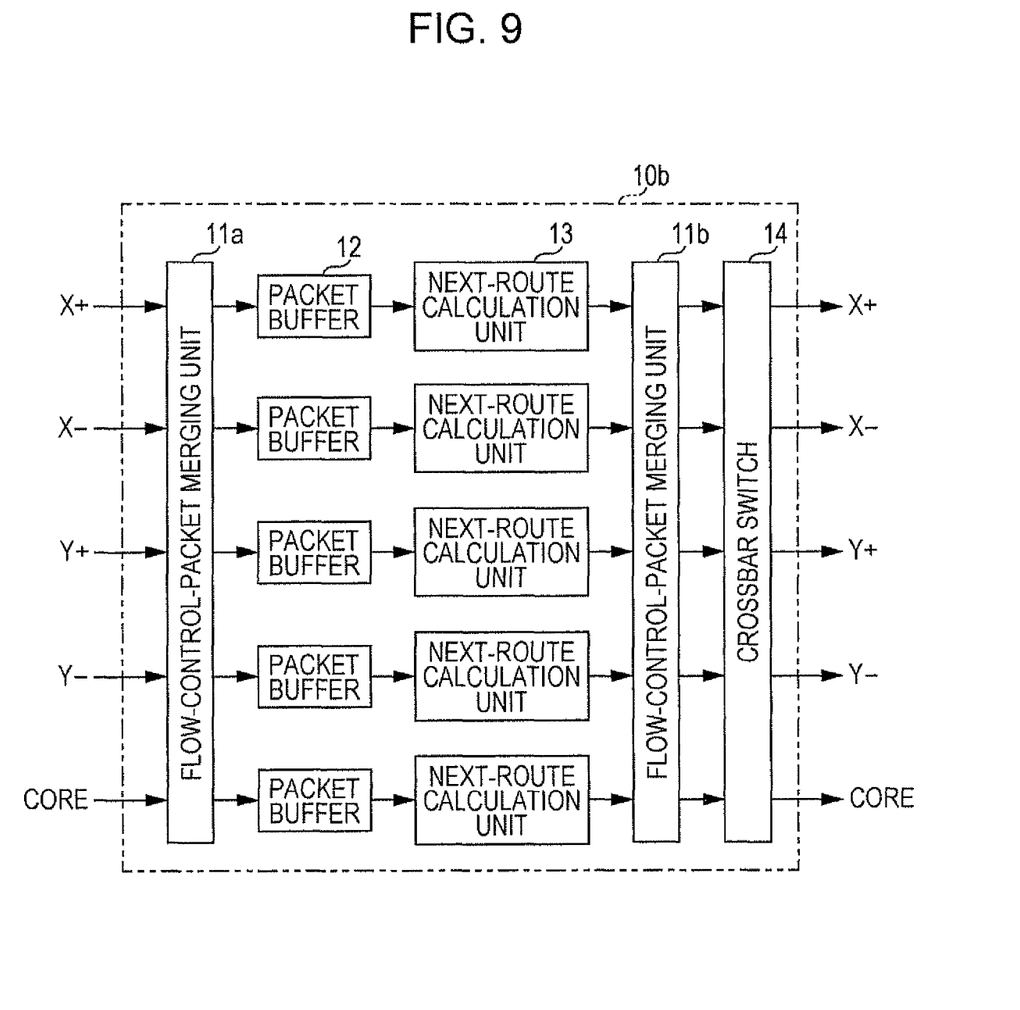
FIG. 9 is a diagram illustrating a hardware configuration of a router in a second modification example.

FIG. 9 is a diagram illustrating a hardware configuration of a router 10b in a second modification example. The difference between the router 10b in the second modification example and the router 10 in the exemplary embodiment is that, in the router 10b, a flow-control-packet merging unit 11b is added between the next-route calculation units 13 and the crossbar switch 14. In other words, flow-control-packet merging units 11a and 11b are disposed at a stage previous to the packet buffers 12 and a stage subsequent to the packet buffers 12, respectively. In the second modification example, when the flow-control-packet merging unit 11a receives multiple flow-control packets, in the case where the destinations of the multiple flow-control packets are the same IP core 30, the flow-control-packet merging unit 11a merges the multiple flow-control packets into one flow-control packet, and replaces the multiple flow-control packets with the one flow-control packet. One of the packet buffers 12 stores the flow-control packet that has been obtained by merging. Furthermore, in this case, the packet buffers 12 also store flow-control packets that have not been merged because the destinations of the flow-control packets are different IP cores 30. Then, in the case where the destinations of the multiple flow-control packets stored in the packet buffers 12 are the same IP core 30, the flow-control-packet merging unit 11b, which is provided at the stage subsequent to the packet buffers 12 and which is connected to the packet buffers 12, merges the multiple flow-control packets into one flow-control packet, and replaces the multiple flow-control packets with the one flow-control packet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An integrated circuit comprising:
a plurality of IP (Intellectual Property) cores; and
a plurality of intermediary circuits that are each connected to one IP core among the plurality of IP cores, and that relay, using an NoC (Network On Chip) scheme, packets which are transmitted/received between the IP cores,
wherein the plurality of intermediary circuits are connected to each other,
and wherein each of the plurality of intermediary circuits replaces, when the intermediary circuit has received a plurality of flow-control packets which are each transmitted from one IP core to another IP core in order to notify the other IP core of free-space information of a data buffer which the one IP core has, in a case where destinations of the plurality of flow-control packets are the same IP core, the plurality of flow-control packets with one flow-control packet including the free-space information included in the individual flow-control packets, and transmits the one flow-control packet to the IP core which is the destination.

2. The integrated circuit according to claim 1, wherein the intermediary circuit
replaces the plurality of flow-control packets whose destinations are the same IP core with one flow-control packet including a bit string that has been obtained by calculating bitwise logical OR of bits included in bit stings in which the free space information of the data buffers is described in the individual flow-control packets, and
transmits the one flow-control packet to the IP core which is the destination.

3. The integrated circuit according to claim 2, wherein the intermediary circuit
includes a storage unit that stores a received packet for only a predetermined time period, and
replaces, in a case where the destinations of the plurality of flow-control packets stored in the storage unit are the same IP core, the plurality of flow-control packets with the one flow-control packet.

4. An electronic device comprising the integrated circuit according to claim 3.

5. The integrated circuit according to claim 2, wherein the intermediary circuit
includes a storage unit that, when the intermediary circuit has received the plurality of flow-control packets, in a case where the destinations of the plurality of flow-control packets are the same IP core, stores the one flow-control packet with which the plurality of flow-control packets have been replaced, and
replaces, in a case where the destinations of the plurality of flow-control packets stored in the storage unit are the same IP core, the plurality of flow-control packets with the one flow-control packet.

6. An electronic device comprising the integrated circuit according to claim 5.

7. An electronic device comprising the integrated circuit according to claim 2.

8. The integrated circuit according to claim 1, wherein the intermediary circuit
includes a storage unit that stores a received packet for only a predetermined time period, and
replaces, in a case where the destinations of the plurality of flow-control packets stored in the storage unit are the same IP core, the plurality of flow-control packets with the one flow-control packet.

9. An electronic device comprising the integrated circuit according to claim 8.

10. The integrated circuit according to claim 1, wherein the intermediary circuit
includes a storage unit that, when the intermediary circuit has received the plurality of flow-control packets, in a case where the destinations of the plurality of flow-control packets are the same IP core, stores the one flow-control packet with which the plurality of flow-control packets have been replaced, and
replaces, in a case where the destinations of the plurality of flow-control packets stored in the storage unit are the same IP core, the plurality of flow-control packets with the one flow-control packet.

11. An electronic device comprising the integrated circuit according to claim 10.

12. An electronic device comprising the integrated circuit according to claim 1.

* * * * *